United States Patent
Kiribayashi et al.

(10) Patent No.: US 6,694,826 B2
(45) Date of Patent: Feb. 24, 2004

(54) DEVICE FOR DETECTING SIGNAL OF SENSING CELLS INTERCONNECTED IN A MATRIX

(75) Inventors: Shinichi Kiribayashi, Anjou (JP); Tadashi Ozaki, Gamagoori (JP); Hiroshi Fujitsuka, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/996,945

(22) Filed: Nov. 30, 2001

(65) Prior Publication Data

US 2002/0067175 A1 Jun. 6, 2002

(30) Foreign Application Priority Data

Dec. 1, 2000 (JP) ........................ 2000-367574

(51) Int. Cl.[7] .............................................. G01L 3/00
(52) U.S. Cl. ............................................... 73/862.046
(58) Field of Search ................................ 324/713, 661, 324/662, 663, 671, 686, 690; 73/862.046; 701/38; 280/735, 602

(56) References Cited

U.S. PATENT DOCUMENTS 4,843,891 A    7/1989   Brunner et al.
5,505,072 A *  4/1996   Oreper ...................... 73/1.59
5,865,463 A    2/1999   Gagnon et al.

FOREIGN PATENT DOCUMENTS

| DE | 19625730 | 1/1998 |
| FR | 2744547 | 8/1997 |
| WO | WO 99/53283 | 10/1999 |

* cited by examiner

*Primary Examiner*—John E. Chapman
*Assistant Examiner*—James Kerveros
(74) *Attorney, Agent, or Firm*—Posz & Bethards, PLC

(57) ABSTRACT

A detecting device (1) is provided to detect signals from a sensing mat (2) including a plurality of sensing cells (R) electrically interconnected to each other in a matrix. Each sensing cell (R) is changeable in resistance with a change in a load to be applied. The detecting device (1) comprises a detecting circuit (Rp) and voltage applying means (5). The detecting circuit (Rp) detects a signal through a conversion of changes in the resistance to changes in voltage. When detecting a sensing cell ($R_{11}$) connected to a specified line path (2a), the voltage applying means (5) applies a particular voltage to the remaining line paths (2a). The particular voltage is for example voltage of which potential is the same as a voltage detected from the selected sensing cell ($R_{11}$). Applying the particular voltage prevents current from bypassing the other line paths irrelevant to the detection.

8 Claims, 5 Drawing Sheets

DEVICE FOR DETECTING SIGNAL OF SENSING CELLS INTERCONNECTED IN A MATRIX

BACKGROUND OF THE INVENTION

1. Field of the Invention

The present invention relates to a device for detecting a signal from a sensor mat composed of a plurality of sensing cells interconnected with each other in a matrix.

2. Related Art

In recent years, automobiles with air bags have been on the increase. However, some drawbacks have been pointed out concerning this air bag. In the case of an automobile with an air bag at the assist seat, some traffic accidents cause the air bag to open, although there is no person at the assist seat. A second problem is that, if a child sits on the assist seat, an open of the air bag may give the child a sudden shock. Therefore, it has been desired that the air bag at the assist seat will not open in cases where no person sits on the assist seat or a child sits on the assist seat.

To solve such undesirable situations, the present applicant has already proposed a crewmember detecting system in which a person-detecting sensor is placed. This system is therefore able to detect if a crewmember sits thereon or not, if a person on the seat is an adult or a child, and/or if a child on the seat uses a child seat or not. The person-detecting sensor used by this system is composed of a pressure sensitive sensor of which electric resistance amount changes with a change in the load to be applied. A plurality of pressure sensitive cells (that is, sensing cells) are used to detect a sat-state of a crewmember with more precision.

The more the number of sensing cells, the more the number of connecting lines with an ECU (Electric Control Unit) in charge of controlling each sensing cell and processing signals detected from each sensing cell. To overcome this inconvenience, the plural sensing cells are electrically interconnected with each in a matrix. Hence the number of connecting lines connected with the ECU has been reduced.

However, the above sensing cells interconnected in the matrix still have a problem in detecting a signal from each sensing cell.

This problem is illustrated by FIG. 1, in which both multiplexers 100 and 110 are operated to detect a signal from a sensing cell $R_{21}$. A channel A2 of one multiplexer 100 and a channel B1 of the other multiplexer 110 are turned on, with the result that a flow of current is caused to pass the sensing cell $R_{21}$ as shown by a solid line. The current flow enables information represented by the sensing cell $R_{21}$ to be outputted to an ECU in the form of a potential divided by a pull-up resistor Rp and the sensing cell $R_{21}$.

However, the flow of current is not limited to that shown by the solid line. Actually, as exemplified by a dashed line in FIG. 1, other current bypasses other sensing cells connected with the sensing cell $R_{21}$ on the present line occur simultaneously with the current flow through the sensing cell $R_{21}$. Such bypassing currents cause a range of voltage detection to narrow, resulting in that it is difficult to detect a signal from each sensing cell with precision.

SUMMARY OF THE INVENTION

An object of the present invention is to provide, with due consideration of the above problem, a detecting device capable of, with more precision, detecting a signal from a sensor composed of a plurality of sensing cells by preventing current from bypassing other sensing cells other than a specified sensing cell to be detected.

In order to realize the above object, the present invention provides a detecting device (1) for detecting a signal from a sensing mat (2). In the sensing mat (2), a plurality of sensing cells (R) are electrically interconnected to each other in a matrix by a plurality of line paths (2a). Each sensing cell (R) has resistance of which amount changes with a change in a load to be applied. The detecting device (1) comprises a detecting circuit (Rp) and voltage applying means (5). The detecting circuit (Rp) detects the signal through a conversion of changes in the amount of the resistance to changes in voltage. When detecting the signal of a sensing cell ($R_{11}$) connected to a specified line path (2a) of the sensing mat (2), the voltage applying means (5) applies a particular voltage to the remaining one or more line paths (2a).

Preferably, the particular voltage is voltage of which potential is the same as a voltage detected from the selected sensing cell ($R_{11}$). Alternatively the particular voltage is voltage of which potential is the same as a voltage applied to the selected line path (2a).

Accordingly, for detecting a signal from each sensing cell (R) connected to each line path (2a) of the sensing mat (2), current is avoided from bypassing other line paths irrelevant to the signal detection of a specified senescing cell.

It is preferred that the voltage applying means (5) includes a buffer circuit (5) having an output terminal (5b) for outputting the voltage of which potential is the same as the voltage detected from the selected sensing cell ($R_11$). In this case, it is still preferred that the device comprises a switching element (3) having a plurality of first terminals (3a) each connected to each line path (2a) of the sensing mat (2) and a plurality of second terminals (A) selectively connecting the plurality of first terminals (3a) to the output terminal (5b) of the buffer circuit (5). For example, the buffer circuit (5) is one in number. The switching element (3) may include a plurality of third terminals (B) selectively connecting the plurality of first terminals (3a) to the detecting circuit (Rp). Preferably, each of the first, second and third terminals (3a, A, B) arranged in the switching element (3) is equal in number to the line paths (2a) of the sensing mat (2).

Accordingly, thanks to a combination of the buffer circuit and the multiplexer, only one buffer circuit is enough for applying the voltage to avoid the current bypass to the other line paths irrelevant to the signal detection. In other words, it is unnecessary to arrange the buffer circuit for each line path of the sensing mat.

PREFERRED EMBODIMENTS OF THE INVENTION

Referring to the accompanying drawings, preferred embodiments of the present invention will now be described.

First Embodiment

Figures 3A, 3B:
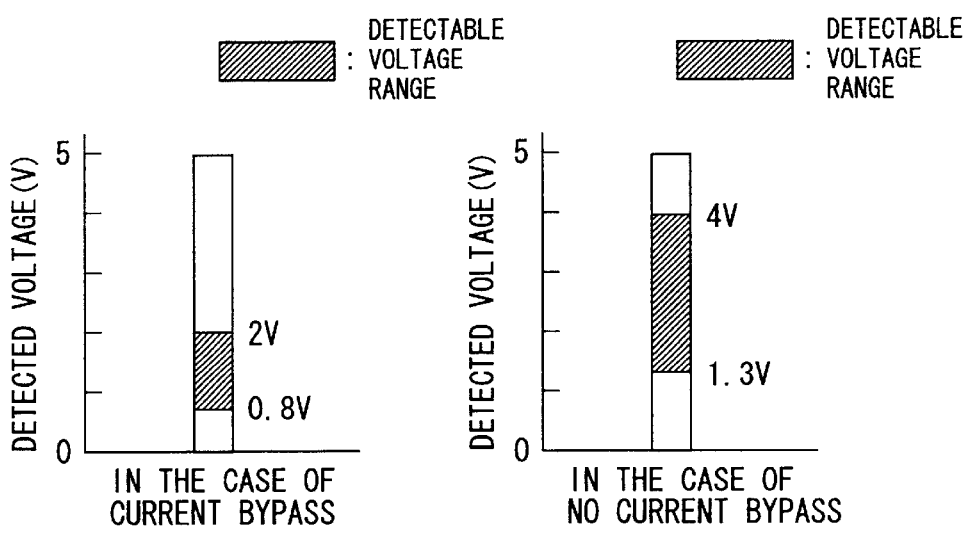
FIG. 3A shows a detectable voltage range estimated in the case that there are current bypasses in a sensing mat.
FIG. 3B shows a detectable voltage range estimated in the case that there is no current bypass in a sensing mat.
Figure 4:
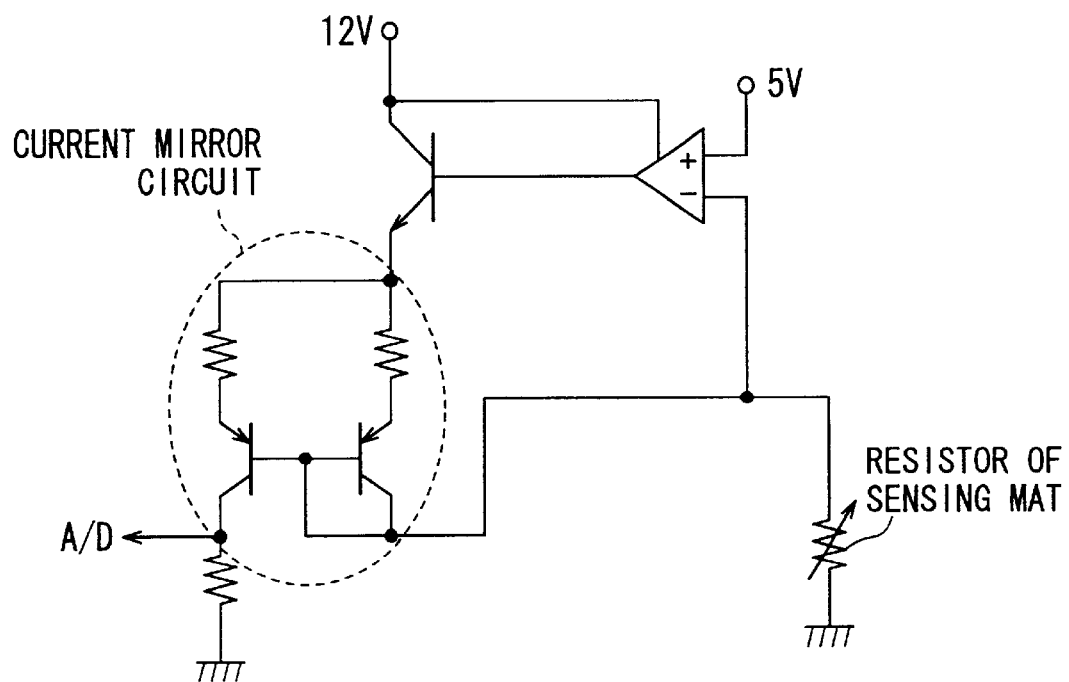
FIG. 4 shows a modification for detecting the output of each sensing cell in the first embodiment.

A first embodiment of the present invention will now be described with reference to FIGS. 2 to 4.

Figure 1:
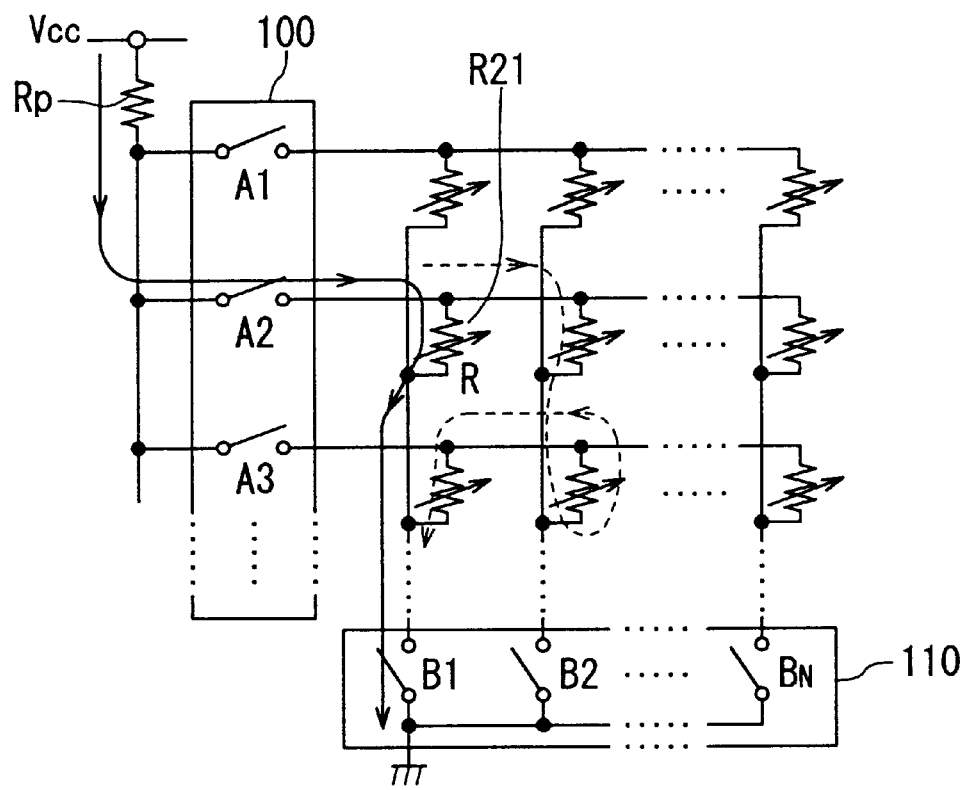
FIG. 1 is the electric diagram outlining a conventional detecting device.
Figure 2:
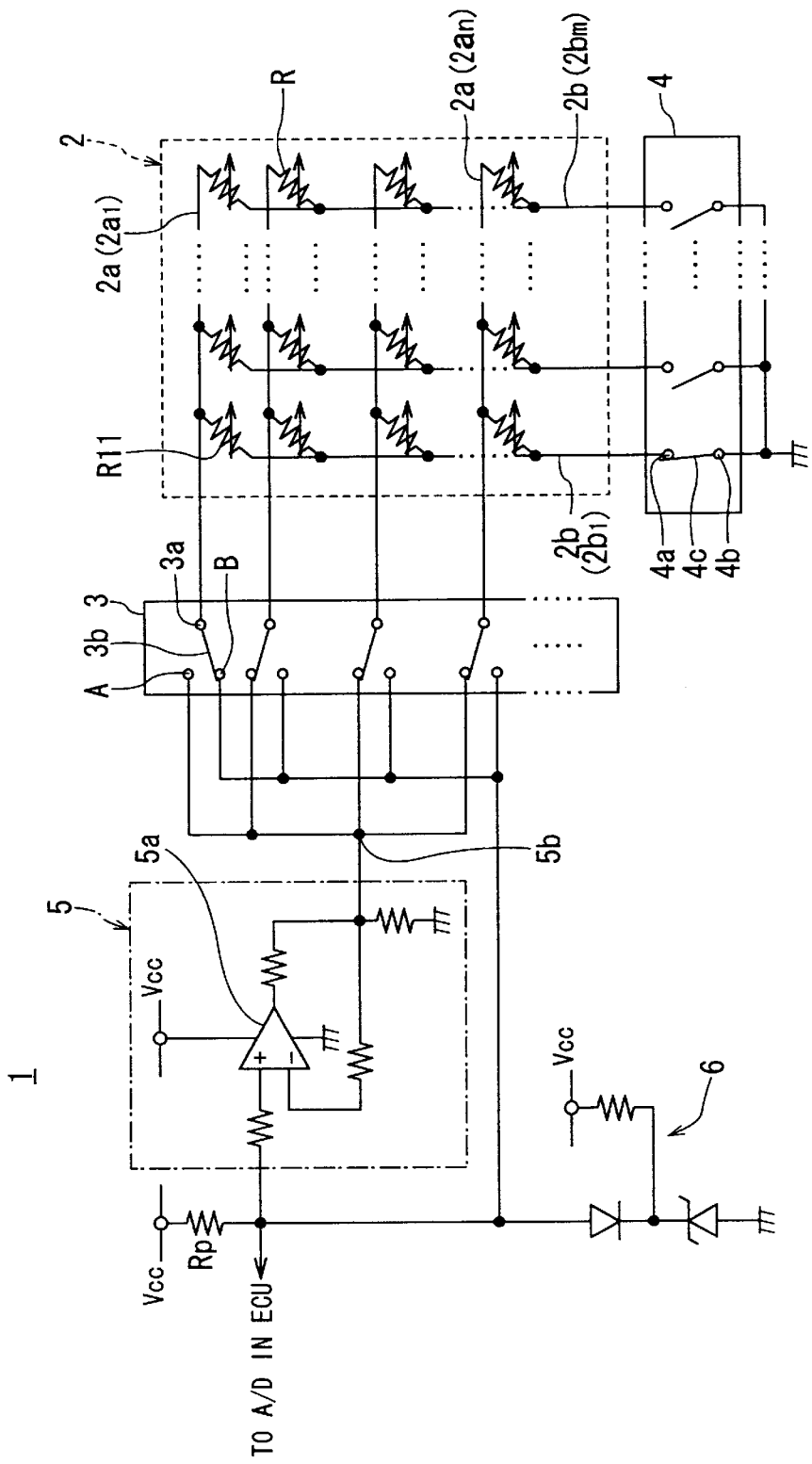
FIG. 2 is the electric diagram showing a detecting device according to a first embodiment of the present invention.

FIG. 2 shows the schematic diagram of a detecting device 1 for detecting signals from a sensing mat 2. This detecting device 1 is provided with a first multiplexer 3 serving as the switching element of the present invention, a second multiplexer 4, a buffer circuit 5, a clamp circuit 6, and a pull-up resistor Rp serving as the detecting circuit according to the present invention.

The sensing mat 2 is responsible for detecting a crewmember in an automobile (practically, the presence or absence of a crewmember, whether the crewmember is an adult or a child, and/or others). As shown in FIG. 2, the sensing mat 2 is composed of a plurality of sensing cells R (:$R_{11}$ to $R_{nm}$) electrically interconnected with each other so as to form a matrix of n-lines and m-columns (n and m are positive integers). The n-lines are formed with n-pieces of line wires (paths) 2a (:$2a_1$ to $2a_n$) and the m-columns are formed with m-pieces of column wires (paths) 2b (:$2b_1$ to $2b_m$). This sensing mat 2 is disposed within a seat (beneath the seat's upper surface on which a crewmember sits) of an automobile.

By the way, the term "mat," which is just used as a representative of thin mat-like members, includes a wide range of mat-like members.

Each sensing cell R includes an upper electrode and a lower electrode which are printed on a film, respectively. When a load (pressure) is applied, a contact area between the electrodes is changed, and thus an amount of electric resistance across the electrodes changes responsively.

The detecting device 1 is configured, as shown in FIG. 2, to detect a signal of each sensing cell R in the form of a potential divided between each cell R and the pull-up resistor Rp. Such divided potential can be expressed by "R/(R+Rp)}·Vcc," where Vcc is the voltage of the power supply. The detected potential is given to a not-shown ECU (Electric Control Unit), precisely an A/D port routed to a CPU incorporated in the ECU.

One multiplexer 3 is placed to switch over line wires 2a of the sensing mat 2, while the other multiplexer 4 is placed to switch over column wires 2b thereof. Further, the buffer circuit 5, which constitutes voltage applying means according to the present invention, is used to prevent current from bypassing other sensing cells R other than a specified one to be detected.

The multiplexer 3 has a plurality of switching sets that corresponds in number to the line wires 2a of the sensing mat 2. Each switching set includes a channel-A terminal connected to an output terminal of the buffer circuit 5, a channel-B terminal connected to a lower-potential side of the pull-up resistor Rp, a connection terminal 3a routed to each line wire 2a of the sensing mat 2, and a switchover piece 3b selectively switching over between the channel-A and -B terminals to be connected with the connection terminal 3a.

The other multiplexer 4 is connected with the column wires 2b of the sensing mat 2. Practically, the multiplexer 4 has a plurality of switching sets that corresponds in number to the column wires 2b. Each switching set of the multiplexer 4 includes a connection terminal 4a routed to each column wire 2b, a ground terminal 4b electrically connected to the ground, and an on/off switch 4c that is able to open and close both the terminals 3a and 4a.

The buffer circuit 5 is configured into a voltage-follower circuit that uses an operational amplifier 5a to make its input and output voltages equal to each other. Hence, the buffer circuit 5 has the capability of supplying an output voltage of which potential is the same as a detected voltage from each sensing cell R to be detected.

The detecting devise 1 shown in FIG. 2 employs the clamp circuit 6 to avoid the operational amplifier 5a placed in the buffer circuit 5 from operating erroneously.

The entire operation and advantages of the detecting device 1 will now be explained.

Suppose that, by way of example, a sensing cell $R_{11}$ located at an intersection defined by the first line and the first column in the sensing mat 2 is detected. In this case, as shown in FIG. 2, the not-shown ECU controls the multiplexer 3 in such a manner that the switchover piece 3b routed to the first line wire 2a is switched over to the channel-B terminal, whilst it controls the other multiplexer 4 to the on/off switch 4c routed to the first column wire 2b is closed (i.e., ON). In contrast, the remaining switchover pieces 3b in the multiplexer 3 are all switched over to their channel-A terminals, and the remaining on/off switches 4c in the other multiplexer 4 are all opened (i.e., OFF).

This control of the multiplexers 4 and 5 creates a current path that passes the sensing cell $R_{11}$ though the multiplexers 3 and 4. Accordingly, signal information indicated by the sensing cell $R_{11}$ is supplied to the ECU in the form of a divided potential "{R11/(R11+Rp)}·Vcc" dependent on the pull-up resistor Rp.

Concurrently with this detection, since the remaining line wires 2a (that is, the second line to the n-th line) irrelevant to the detection are all connected to their channel-A terminals, the output voltage (of which potential is the same as a detected one using the sensing cell $R_{11}$) of the buffer circuit 5 is applied to the second to n-th line wires 2a via the multiplexer 3. This application of voltage avoids current from bypassing the sensing cells R all irrelevant to the detection.

A detectable voltage range for each sensing cell R will now be compared between two cases; one case is that there are current bypasses and the other case is that there is no current bypass. When it is supposed that the power supply voltage Vcc is 5 V and a variable range of resistance of each sensing cell R is 10 to 100 kΩ, the detectable voltage range in the former case is wider that in the latter case, as comparatively shown in FIGS. 3A and 3B. In other words, the detectable voltage range obtained when there is no current bypass is superior to that obtained in the case having current bypasses.

As a result, when the ECU commands the multiplexers 3 and 4 to switch in the same manner as that in sensing the sensing cell $R_{11}$, as above, the current bypasses can be avoided thanks to the application of output voltage of the buffer circuit 5 to the sensing cells free from the detection. Accordingly, signal information represented by each sensing cell R can be detected with precision.

Moreover, the present embodiment employs a combination of the buffer circuit 5 and the multiplexer 3, with the result that this combination eliminates the necessity of arranging the buffer circuit 5 for each line wire 2a of the sensing mat 2. That is, the buffer means for all the line wires 2a can be integrated into only one buffer circuit 5, whereby simplifying the entire structure of the detecting device 1.

As a modification of the above embodiment, how to detect a signal from each sensing cell R may be changed into another one. Practically, instead of the way of detecting the signal as a divided potential by a combination of the pull-up resistor Rp and each cell R, a constant-voltage detecting circuit that uses a current-mirror circuit as shown in FIG. 4 can be adopted.

Second Embodiment

Figure 5B:
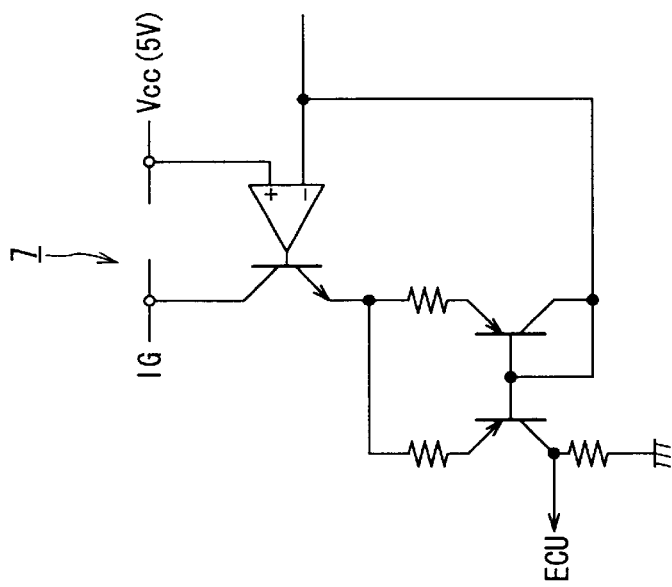
FIG. 5B shows a constant-voltage circuit including a detecting circuit, which is arranged line by line to a sensing mat.
Figure 5A:
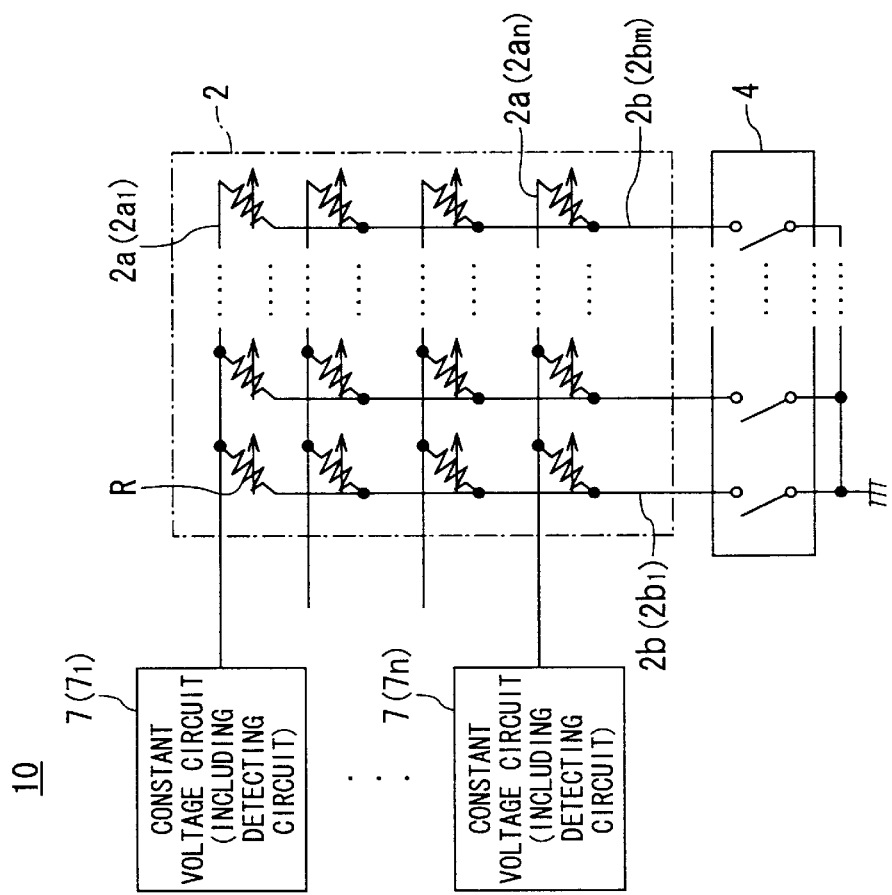
FIG. 5A is the electric diagram outlining a detecting device according to a second embodiment of the present invention.

Referring to FIGS. 5A and 5B, a second embodiment of the present invention will now be described.

FIG. 5A outlines the configuration of a detecting device 10 according to the second embodiment. This detecting device 10 includes a plurality of constant voltage circuits (each including a detecting circuit) 7 (:$7_1$ to $7_n$) for sensing cells. The constant voltage circuits 7 are made equal in number to the line wires 2a of the sensing mat 2.

Each constant voltage circuit 7 serves as the voltage applying means and the detecting circuit of the present invention, and its circuitry is exemplified by FIG. 5B. Each constant voltage circuit 7 is able to apply its detected voltage to each line wire 2a, whereby reducing current that bypasses other sensing cells R other than a specified sensing cell to be detected in each line 2a of the sensing mat 2.

For the sake of completeness it should be mentioned that the embodiments explained above are not definitive lists of possible embodiments. The expert will appreciate that it is possible to combine the various construction details or to supplement or modify them by measures known from the prior art without departing from the basic inventive principle.

What is claimed is:

1. A detecting device for detecting a signal from a sensing mat in which a plurality of sensing cells are electrically interconnected to each other in a matrix by both a plurality of line paths each connected to two or more of the plurality of sensing cells and a plurality of column paths each connected to two or more of the plurality of sensing cells, each sensing cell having a resistance value varying with a change in a load applied thereto, the detecting device comprising:

a detecting circuit for detecting a signal from the two or more of the plurality of sensing cells by converting the resistance value to a change in voltage; and a voltage applying circuit for applying a particular voltage, when the detecting circuit detects the signal from a designated one of the two or more of the plurality of sensing cells and connected to a designated line path among the plurality of line paths of the sensing mat to remaining one or more line paths other than the designated line path of the sensing mat, the particular voltage being equal to a voltage detected by the detecting circuit at the designated sensing cell.

2. The detecting device according to claim 1, wherein the voltage applying circuit includes a buffer circuit having an input terminal connected to the detecting circuit and having an output terminal for outputting the voltage of which potential is equal to the voltage detected from the designated sensing cell.

3. The detecting device according to claim 2, further comprising a switching element having a plurality of first terminals each connected to each line path of the sensing mat, a plurality of second terminals selectively connecting the plurality of first terminals to the output terminal of the buffer circuit, and a plurality of third terminals each connected to the detecting circuit, each of the plurality of first terminals, each of the plurality of second terminals, and each of the plurality of third terminals being operative to each line path, and each of the plurality of first terminals being selectively connected to respective ones of either the plurality of second terminals or the plurality of third terminals.

4. The detecting device according to claim 3, wherein the buffer circuit comprises a single buffer circuit, and the output terminal of the buffer circuit is connected to all of the plurality of second terminals.

5. The detecting device according to claim 4, wherein respective numbers of the plurality of first, second and third terminals arranged in the switching element are equal to the line paths of the sensing mat.

6. The detecting device according to claim 2, further comprising a second switching element having a plurality of on/off switches respectively connected to the plurality of column paths.

7. The detecting device according to claim 1, wherein the particular voltage applied by the voltage applying circuit is equal in potential to a voltage applied to the designated line path.

8. A device for detecting signals from variable resistance sensing cells interconnected in a matrix by line paths and column paths, comprising:

a detecting circuit for detecting signals from the sensing cells representative of respective changes in voltage at the sensing cells when a load is applied thereto; and a voltage applying circuit for applying a particular voltage signal to all other line paths when the detecting circuit detects a voltage at a designated sensing cell on a designated line path, the particular voltage signal being equal to the voltage detected by the detecting circuit at the designated sensing cell on the designated line path.

* * * * *